US008276245B2

(12) United States Patent
Huang

(10) Patent No.: US 8,276,245 B2
(45) Date of Patent: Oct. 2, 2012

(54) WINDOW CURTAIN PULL CORD CONCENTRATOR SAFETY DEVICE

(76) Inventor: Hsien-Te Huang, Taipei (TW)

( * ) Notice: Subject to any disclaimer, the term of this patent is extended or adjusted under 35 U.S.C. 154(b) by 0 days.

(21) Appl. No.: 12/938,601

(22) Filed: Nov. 3, 2010

(65) Prior Publication Data

US 2012/0066869 A1 Mar. 22, 2012

(30) Foreign Application Priority Data

Sep. 16, 2010 (TW) ................................ 99131534 A

(51) Int. Cl.
*F16G 11/10* (2006.01)
*E06B 9/00* (2006.01)

(52) U.S. Cl. . 24/115 F; 24/128; 24/136 K; 160/178.1 R

(58) Field of Classification Search ................. 24/115 F, 24/128, 122.6, 115 K, 115 H, 136 K, 115 R; 160/178.1 R, 168.1 R, 173 R; 43/44.91
See application file for complete search history.

(56) References Cited

U.S. PATENT DOCUMENTS

| | | | | |
|---|---|---|---|---|
| 333,648 | A * | 1/1886 | Lothrop | 403/206 |
| 1,420,897 | A * | 6/1922 | Wetzel | 403/206 |
| 2,241,367 | A * | 5/1941 | Sarff | 43/43.2 |
| 4,140,412 | A * | 2/1979 | Vitt | 403/28 |
| 4,471,509 | A * | 9/1984 | Marks | 24/3.3 |
| 4,803,798 | A * | 2/1989 | Hannah | 43/43.13 |
| 6,053,156 | A * | 4/2000 | Boon | 124/20.1 |

* cited by examiner

*Primary Examiner* — Robert J Sandy
*Assistant Examiner* — Michael Lee
(74) *Attorney, Agent, or Firm* — Muncy, Geissler, Olds & Lowe, PLLC

(57) ABSTRACT

A window curtain pull cord concentrator safety device of the present invention provides a concentrator device which enables the gathering together of the free ends of a plurality of pull cords of a window curtain set, and enables complete transmission of a pulling force in an emergency. And basically comprises a drag cup, an inner bottom of a concave cavity of which is provided with a through hole enabling a wire hoop body coupled to a pulling member to penetrate therethrough. The wire hoop body is located in the interior of the drag cup, and displacement of an inner loop side of the wire hoop body relative to the drag cup is used to determine whether the free ends of the pull cords are radially restrained, thereby enabling complete relay transmission of the pulling force. In an emergency, the pull cords are rapidly released, thereby achieving instantaneous prompt safety effectiveness.

6 Claims, 12 Drawing Sheets

B-B'

A-A'

WINDOW CURTAIN PULL CORD CONCENTRATOR SAFETY DEVICE

BACKGROUND OF THE INVENTION (a) Field of the Invention

The present invention provides a window curtain pull cord concentrator safety device, and more particularly provides a concentrator device which enables the gathering together of the free ends of a plurality of pull cords of a window curtain set, as well as providing a relay coupling function which enables complete transmission of a pulling force. Moreover, in an emergency, the device instantaneously and easily releases a binding force effected by the pull cords, thereby rapidly safeguarding limbs entangled by the pull cords. The present invention uses a wire hoop body to restrain the pull cords to achieve a coupling enabling complete transmission of motive force, and when a child mistakenly operates the pull cords, the device conveniently and easily causes the wire hoop body to burst open, thereby rapidly releasing the pull cords, and causing the pull cords to relinquish the binding force on limbs caught up in the pull strings, thus achieving rapid safety effectiveness.

(b) Description of the Prior Art

Apart from aesthetics, the objective of installing window curtains primarily lies in adjusting interior and exterior light flux of a house. And adjustment means of the window curtains is commonly provided with pull cords, which are used to pull and thereby change the breadth of the curtains in order to adjust the shade mode. Because the pull cords hang down on one side of the window curtain set, thus there is the danger of the limbs of an unknowing child playing nearby becoming entangled in the pull cords. Referring to FIG. 1, which shows a window curtain set 10 of the prior art, in which the free ends of a plurality of pull cords 11 are tied together to form a knot 111. A user is able to grasp the pull cords 11 or the knot 111 to effect a downward pulling operation, thereby enabling window slats 12 to be upwardly gathered together in order to allow more light in. However, because of the plurality of pull cords 11, the knot at the ends of al least two of the pull cords cause a closed loop to form, and when a child is playing nearby, the closed loop often entangles limbs 13 of a child, thereby endangering the child. Hence, an improvement on the design was made, as depicted in FIG. 2, in which the free ends of the plurality of pull cords 11 are separately provided with a knot 110, which enable a user to grasp and pull the pull cords. A plurality of knotted cord ends 110 are mutually dispersed, thereby preventing the possibility of the limbs of a child from becoming entangled in the pull cords 11. However, when a user is operating pull cords 11, each of the knotted cord ends 110 must be grasped in order to apply an average force thereto, otherwise the pull cords are unable to function in synchronization. Hence, for convenience of operation, a further improvement was made in the design, as depicted in FIG. 3, in which the free ends of the plurality of pull cords 11 are bunched together through a cord buncher 112. After bunching the pull cords 11, the system downwardly connects to a draw cord 100, with the cord buncher 112 situated at a high position of a window curtain set 10, far out of reach of young children, thereby preventing young children from touching it. A user operating the draw cord 100 is able to adjust the window slats 12 to change shade mode thereof. However, after the user pulls and gathers up the slats 12, because of the limitations of ergonomics, the cord buncher 112 will be correspondingly displayed downward close to the waist position, thereby still enabling a child to touch it. Accordingly, the danger as described for FIG. 1 still exists.

SUMMARY OF THE INVENTION

A window curtain pull cord concentrator safety device of the present invention enables the gathering together of the free ends of a plurality of pull cords of a window curtain set, and when operating the curtains, enables complete transmission of a pulling force. Moreover, in an emergency, the device instantaneously and easily releases a binding force on limbs effected by the pull cords. In order to achieve the aforementioned objective, the present invention basically comprises a cord gathering drag cup provided with a concave cavity, the inner bottom of which is downwardly provided with a through hole, which enables a wire hoop body coupled to the upper end of a pulling member to penetrate therethrough. Displacement of an inner loop side of the wire hoop body relative to the surface of a cavity bottom of the drag cup is used to determine whether the free ends of the pull cords are radially restrained or not, thereby enabling complete relay transmission of the pulling force. And in an emergency, the pull cords can be rapidly released, thereby achieving instantaneous prompt safety effectiveness.

A second objective of the present invention lies in the inner bottom of the drag cup, in which two mutually correspondingly through holes downwardly penetrate, and enable two side sections of the wire hoop body to pass therethrough. The upper surface between the two holes forms a banded arch pressure surface, which enables to effect a banded clamping counter pressure match on the upper arch of the wire hoop body.

A third objective of the present invention lies in providing the arch pressure surface with a domed curved surface to increase linear length or the banded area, thereby achieving a larger frictional force. Moreover, the surface can be provided with a rough surface to assist pressure friction.

A fourth objective of the present invention lies in the cavity bottom of the drag cup, in which a perpendicular groove portion is downwardly cut out between and parallel to the two through holes. Two sides of the perpendicular groove portion effect a clamping pressure on the exterior of a hook cluster of knots curvedly formed when the pull cords are pulled. And the counterforce of the clamping pressure is used to further support the fixed hanging position of the drag cup.

A fifth objective of the present invention lies in the wire hoop body which is formed from a flexible puling member that is extended and looped to form a single body therewith. A pulling handle is fitted to an exterior of a junction point, and the pulling handle is used to grasp and pull. Furthermore, the junction point of the wire hoop body can be combined and fabricated from wire rod.

To enable a further understanding of said objectives and the technological methods of the invention herein, a brief description of the drawings is provided below followed by a detailed description of the preferred embodiments.

DETAILED DESCRIPTION OF THE PREFERRED EMBODIMENTS

The following description of the drawings details the structure and operating principle related to the present invention:

The window curtain pull cord concentrator safety device of the present invention provides a cord gathering device, which enables the free ends of a plurality of pull cords of a window curtain set to be gathered together, and enables the pull cords to completely transmit a pulling force. In an emergency, the binding force of the pull cords on limbs entangled therein is instantaneously and easily released to rapidly safeguard the limbs. An implementation of the present invention was carried out by joining the cord gathering device to the free ends of a set of pull cords of a window curtain, and after completing testing, the present invention was clearly able to completely transmit the pulling force when a person carried out the opening operation of the window curtain. Accordingly, when an unknowing child plays with the hanging free ends of a set of pull cords, and the limbs become entangled in the pull cords, then the gathering of pull cords 11 are timely and rapidly released according to the acting force direction caused by erroneous movement of the bound limbs, causing the free ends of the pull cords 11 to instantly burst apart and release the binding force on the limbs, thereby obtaining rapid and safe effectiveness.

Figure 1:
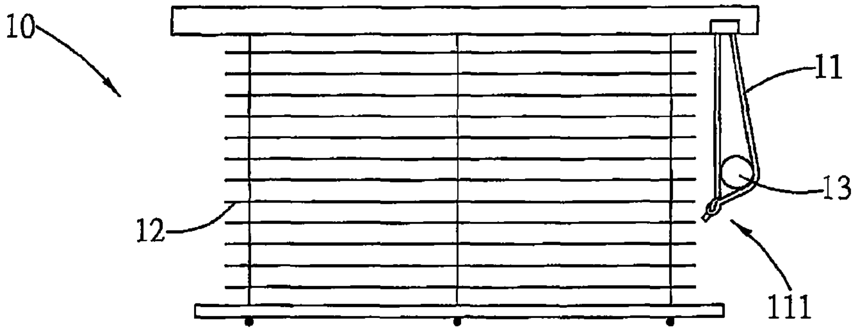
FIG. 1 Prior Art
FIG. 1 is an implementation schematic view of a window curtain pull cord of the prior art.
Figure 2:
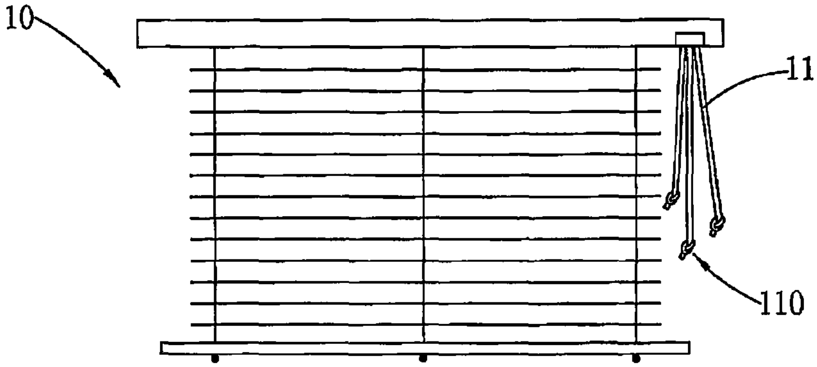
FIG. 2 Prior Art
FIG. 2 is a second implementation schematic view of a window curtain pull cord of the prior art.
Figure 3:
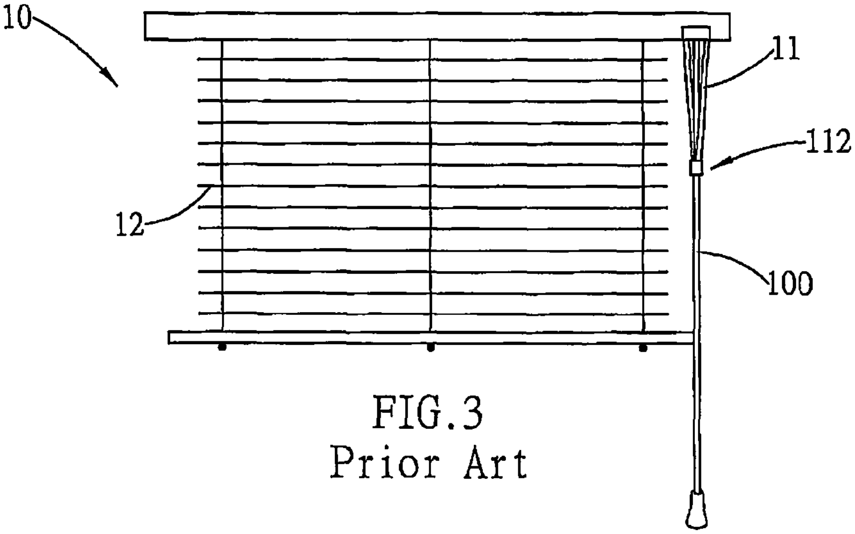
FIG. 3 Prior Art
FIG. 3 is a third implementation schematic view of a window curtain pull cord of the prior art.
Figure 4:
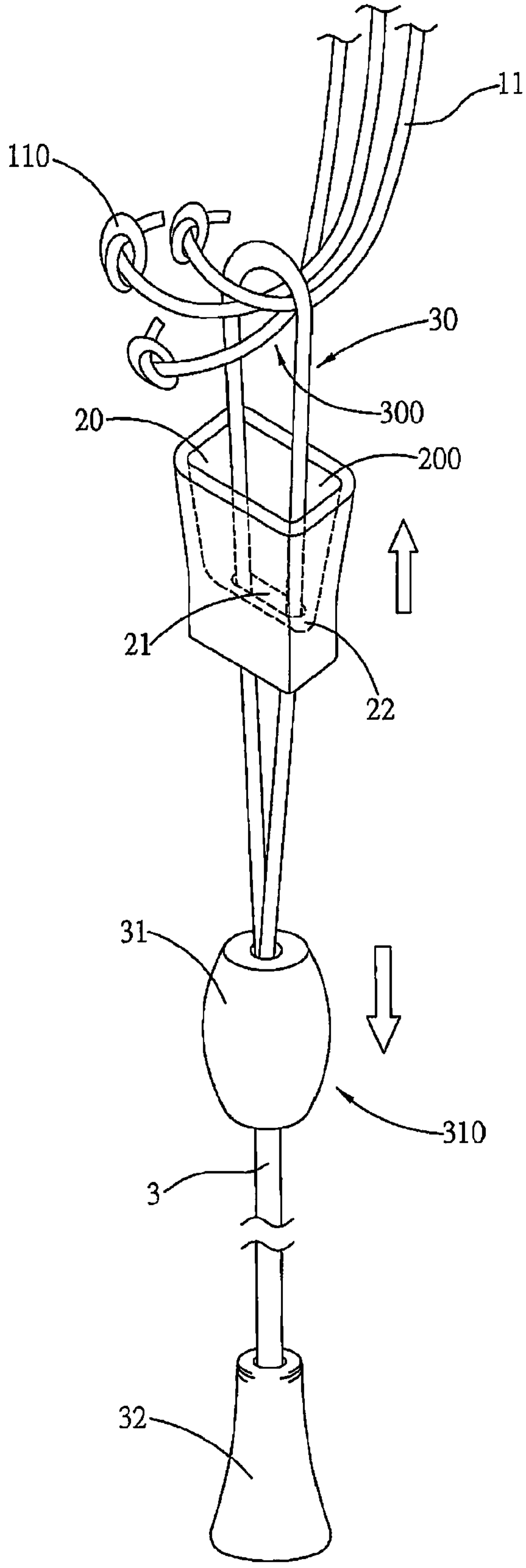
FIG. 4 is a relational combination view of an embodiment of the present invention.
Figure 5:
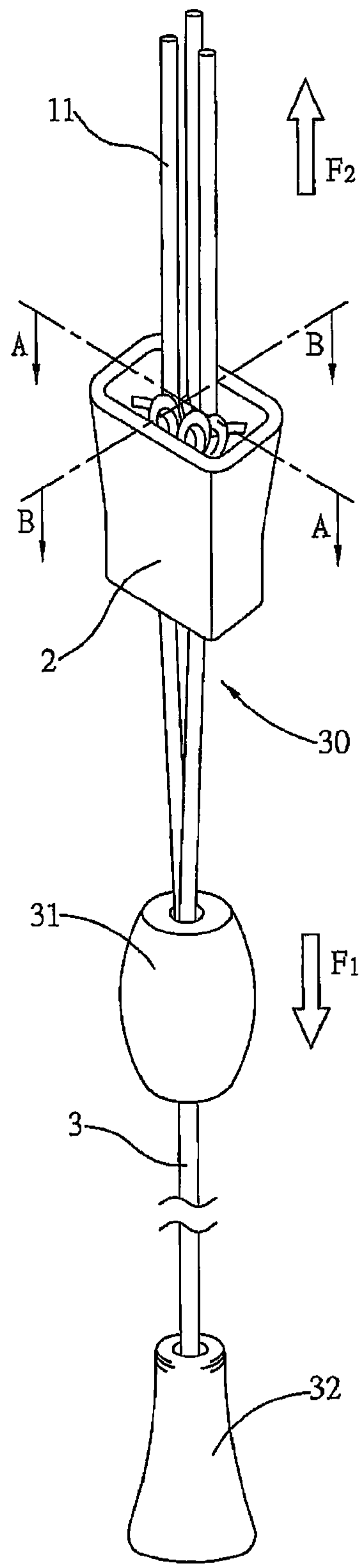
FIG. 5 is a completed combination view of the embodiment of the present invention.

Referring first to FIGS. 4 and 5, which show the present invention depicting gathering together of the free ends of a plurality of the pull cords 11 of a window curtain set, and a coupling which simultaneously enables a pulling operation function; wherein the present invention basically comprises a drag cup 2, an upper portion of which is provided with an opening 200, a concave cavity 20 which inwardly recedes lengthways from the inner edge of the opening 200, a cavity bottom 22 located at a bottom portion of the cavity 20, and the cavity bottom 22 downwardly links up with at least one through hole 21; a flexible looped wire hoop body 30, which upwardly passes through the through hole 21 from the bottom portion of the drag cup 2 and enters the inner space of the concave cavity 20 in preparation to gather together the pull cords 11. Gathering means uses the inner loop of the wire hoop body 30 to enable the free end head portions of the pull cords 11 to pass therethrough, and the ends of the pull cords 11 are provided with knotted cord heads 110. The wire hoop body 30 is joined together by a junction point 31 to form a closed form, with the junction point 31 being positioned beneath and exterior to the drag cup 2, and downwardly connects with a pulling member 3. When a pulling force is applied to the pulling member 3, the pulling force is transmitted to the wire hoop body 30.

A downward pulling handle 32 is fitted to the lower end of the pulling member 3, and the downward pulling handle 32 is located exterior to the junction point 31, and the junction point 31 is formed from a sleeve 310 enclosing and clamping round the junction point 31, providing a grasp and pull basis for a two-stage pulling operation by a user. The cord body of the pull cords 11 can also form a downward pulling grasp and pull basis for a three-stage pulling operation.

Figure 6:
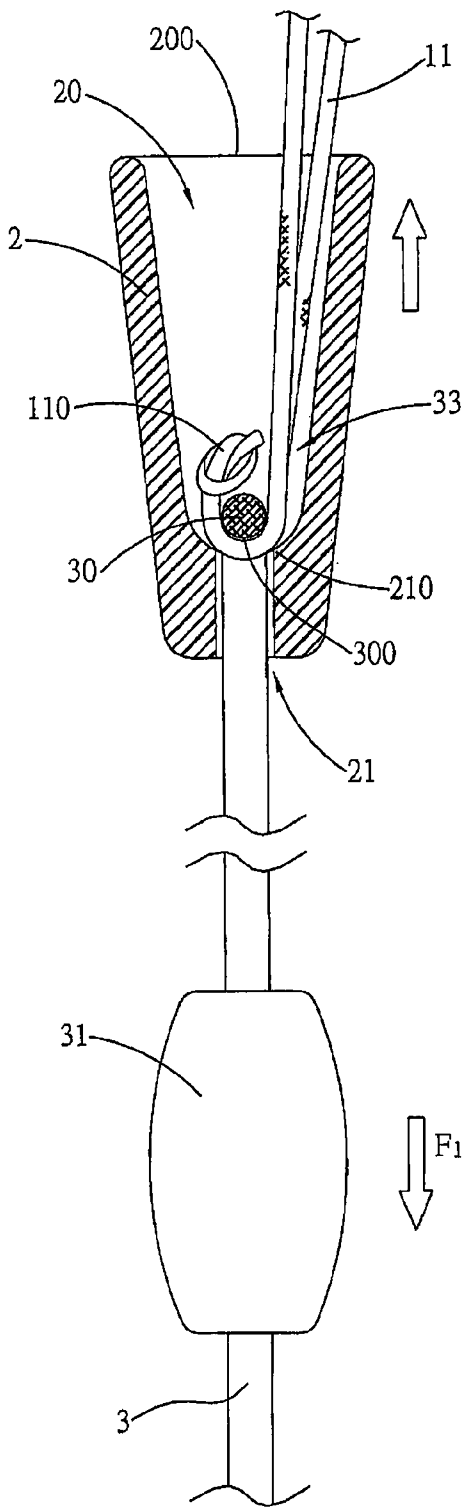
FIG. 6 is a cutaway view depicting a portion of the components along the line B-B' of FIG. 5.

The inner loop of the aforementioned wire hoop body 30 enables the free ends of the pull cords 11 to pass therethrough. When the wire hoop body 30 is pulled downward, the upper arc section of the inner loop side 300 of the wire hoop body 30 engirdles, clutches and pulls the free ends of the pull cords 11 downward into the cavity 20 of the drag cup 2 to form a hook cluster of knots 33 (as depicted in FIG. 6), which is finally pulled to the surface of the cavity bottom 22. The inner loop of the wire hoop body 30 restrains the pull cords 11, and the exterior of the hook cluster of knots 33 formed is restricted by the aperture of the through hole 21, thereby enabling the inner loop side 300 to produce a restraining function on the free ends of the pull cords 11. At which time, mutual friction between the pull cords 11 or the wire hoop body 30 or the exterior of the entire hook cluster of knots 33 and the surface of the cavity 20 or the inner circumferential surface of the through hole 21 enables fixedly positioning of the drag cup 2. More importantly, regarding the aforementioned mutual friction fixedly positioning the drag cup 2, if only a slight downward external force acts on the system, then the drag cup 2 readily releases its grip, thereby enabling the through hole 21 to drop downward, and thus no longer able to maintain the restraining state confining the wire hoop body 30. The free ends of the pull cords 11 immediately burst open, thereby enabling the present invention to instantaneously safeguard the limbs and achieve the primary safety objective.

When a user draws up or lets down the curtain, an acting force is applied to the pulling member 3, thereby causing the pulling member 3 to form a downward pulling force F1, which is transmitted to the pull cords 11 through the wire hoop body 30. Because the upper ends of the pull cords 11 are relationally assembled to the window curtain set (not shown in the drawings) and in a semifixed state, thus a counterforce F2 is produced. The downward pulling force F1 and the counterforce F2 are in opposite directions, and the coupling force between the two is effected through the restraint of the wire hoop body 30 acting on the pull cords 11 and the mutual friction between the hook cluster of knots 33 and the interior of the drag cup 2.

Figure 7:
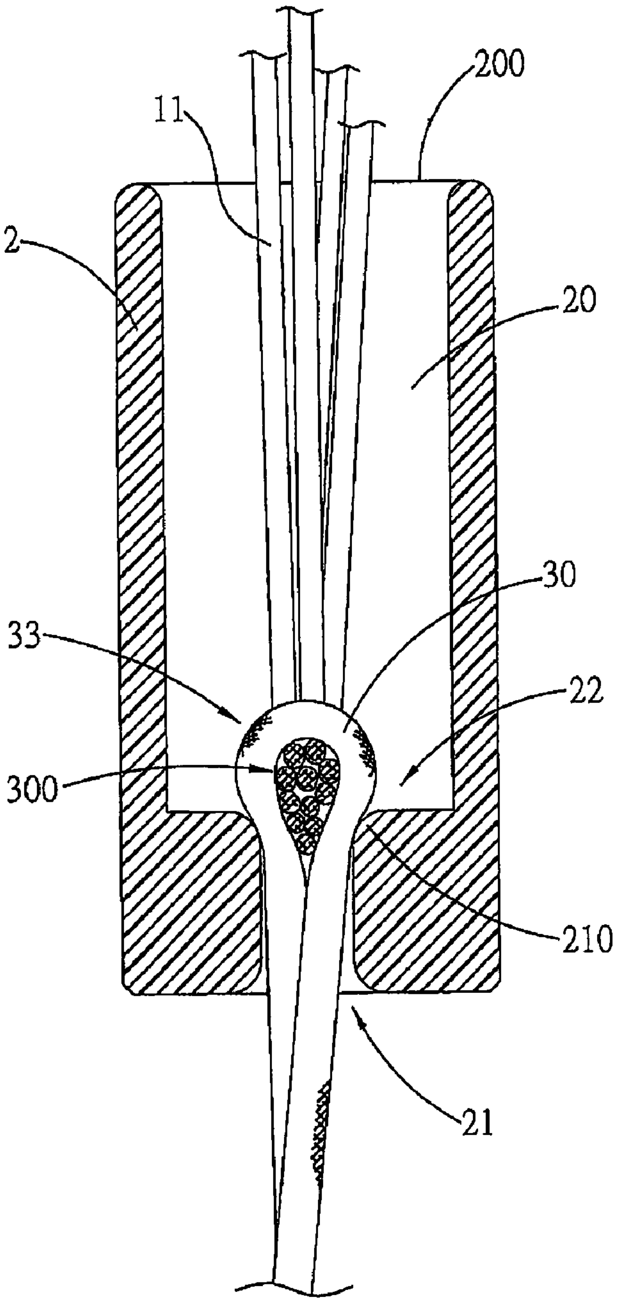
FIG. 7 is a cutaway view depicting a portion of the components along the line A-A' of FIG. 5.

Referring to FIGS. 6 and 7, FIG. 6 is a partial structural cutaway view along the line B-B' of FIG. 5, and FIG. 7 is a partial structural cutaway view along the line A-A' of FIG. 5. The drawings depict operational specification of the wire hoop body 30 beam restraining the pull cords 11. And as described above, the aforementioned wire hoop body 30 passes through the through hole 21 and is penetratingly disposed in the interior of the drag cup 2, and is restricted by the range of the aperture width of the through hole 21, thereby causing the inner loop side 300 of the wire hoop body 30 to engirdle, clutch and restrain the free ends of the pull cords 11 (the restraining action also enables a gathering function of the free ends of the multiple pull cords 11).

Applicable states of the present invention include three use modes: a static state, a dynamic state and an emergency state. Relational operation of the combination state between the various components in a static state will be first described.

When the wire hoop body 30 passes through the through hole 21 from the bottom portion of the drag cup 2 and reaches the inner space of the cavity 20 of the drag cup 2, then the two side exteriors of the wire hoop body 30 are restricted by the aperture of the through hole 21, thus, when the wire hoop body 30 is caused to be pulled down, because the diameter of the inner loop of the wire hoop body 30 becomes smaller, thus, the cord bodies of the pull cords 11 are restrained, which is further assisted by the pull cords 11 and the wire hoop body 30 being made from flexible material, such as spun yarn, which is not provided with any noticeable restoring force after being deformed by an external force, and friction between the exterior of the knotted cluster formed by the pull cords 11 and the wire hoop body 30 and the cavity bottom 22 and the surface of the through hole 21, along with no noticeable affect from gravitational force because of the small mass of the wire hoop body 30. Accordingly, fixed positioning the drag cup 2 relies solely on the aforementioned frictional force to prevent the drag cup 2 from dropping downward, while supporting restraining action of the wire hoop body 30 on the free ends of the pull cords 11. This is the combination state between the various components when in a static state.

During dynamic use, when the user pulls the pulling member 3 downward to operate the curtain (not shown in the drawings), the inner loop side 300 of the wire hoop body 30 first transmits a downward clamping force that acts on the radial body section of the pull cords 11. After the pull cords 11 are subjected to the radial force, then a restraining counterforce is transmitted to the surface of the cavity bottom 22 or angle ends 210 at the opening of the through hole 21, and the pull cords 11 are restrained by the curved surfaces of the hook cluster of knots 33. Moreover, surface friction of adjacent components prevents the pull cords from breaking away. A characteristic of the present invention is the greater the downward pulling force F1 applied, then the acting force of restraint formed will be in direct ratio thereto, thereby enabling complete transmission of the pulling force from the pulling member 3 to the pull cords 11.

The ends of the pull cords 11 form the knotted cord ends 110, and the knotted cord ends 110 form a clasping effect, thereby preventing the free ends of the pull cords 11 from easily breaking away, especially when in dynamic restraining motion. Because the wire hoop body 30 is restricted by the through hole 21, thus the size of the restraining loop of the wire hoop body 30 is in inverse proportion to the pulling force, that is, the greater the pulling force applied, the smaller the diameter of the restraining loop of the wire hoop body 30, the limit of which is the largest dimensions of the cross section of the body of the pull cords 11 that effects resistance against the clamping pressure. Furthermore, because the diameter of the knotted cord ends 110 is larger than the cross section of the pull cords 11, thus, the knotted cord ends 110 are prevented from slipping free from the inner loop side 300 of the wire hoop body 30, thereby enabling more effective restraining of the free ends of the pull cords 11.

In an emergency, when an unknowing child plays with the pull cords 11 causing binding of limbs, as described above, then the present invention provides a rapid bursting open action that achieves the safety objective of effecting an instantaneous emergency measures.

Figure 8:
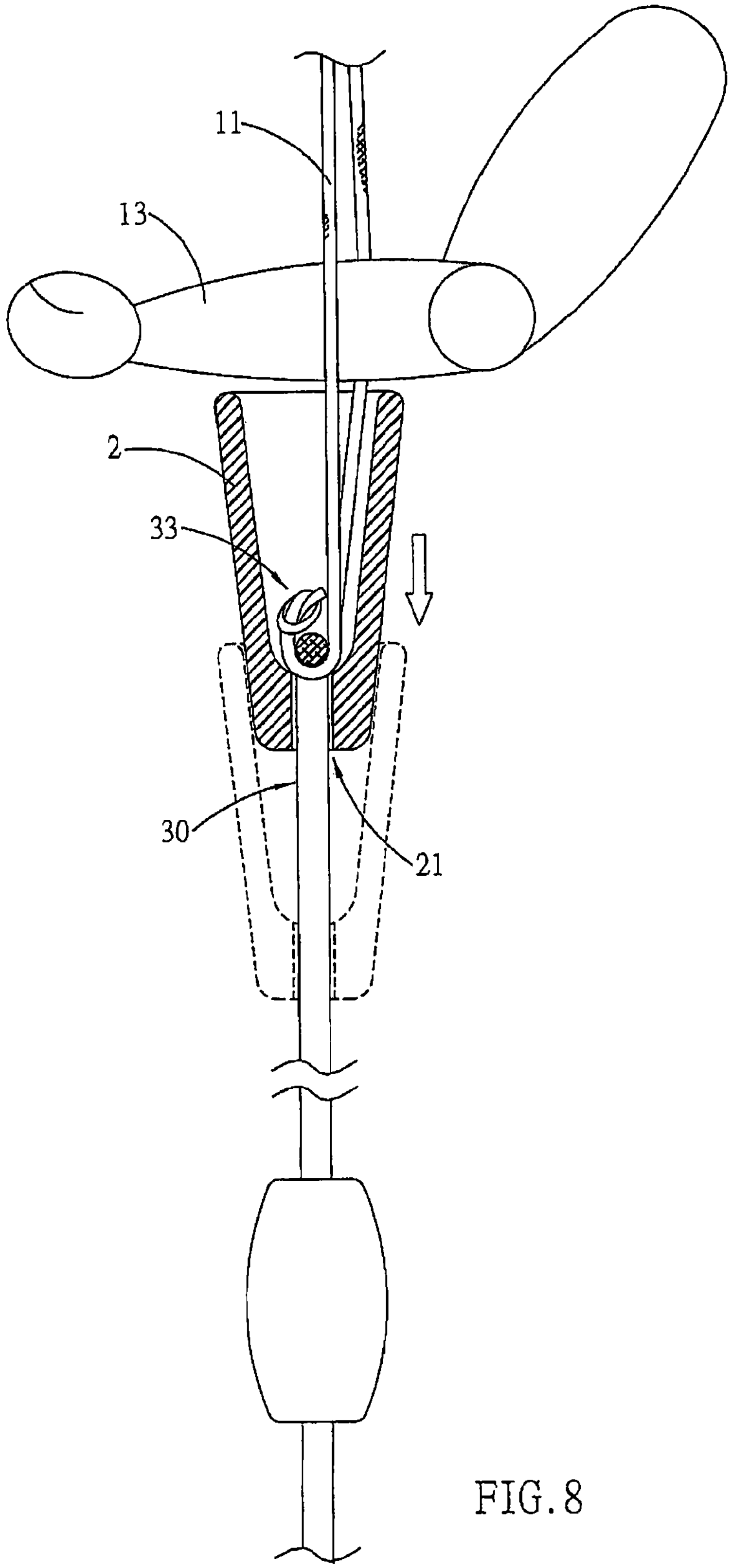
FIG. 8 is a schematic view depicting a safety operation according to the present invention.
Figure 9:
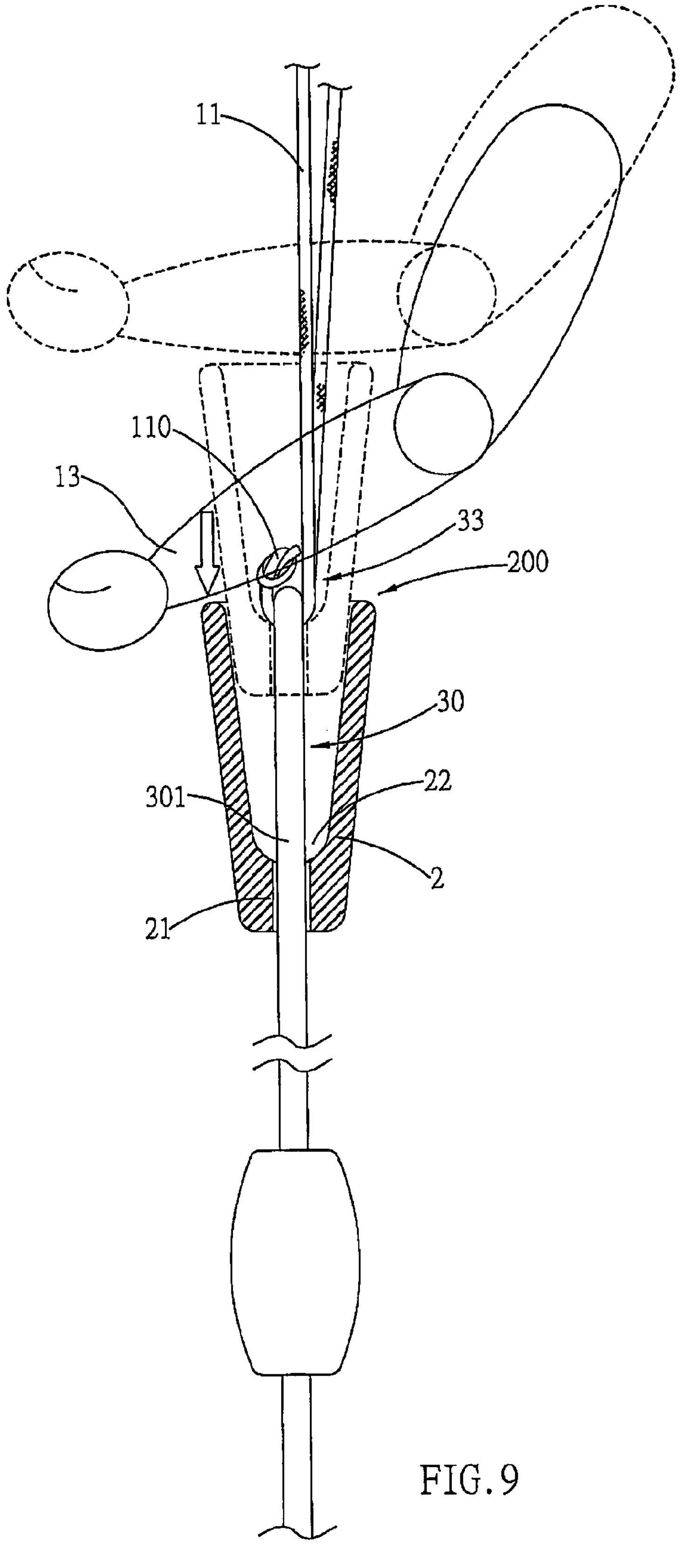
FIG. 9 is another schematic view a depicting safety operation according to the present invention.
Figure 10:
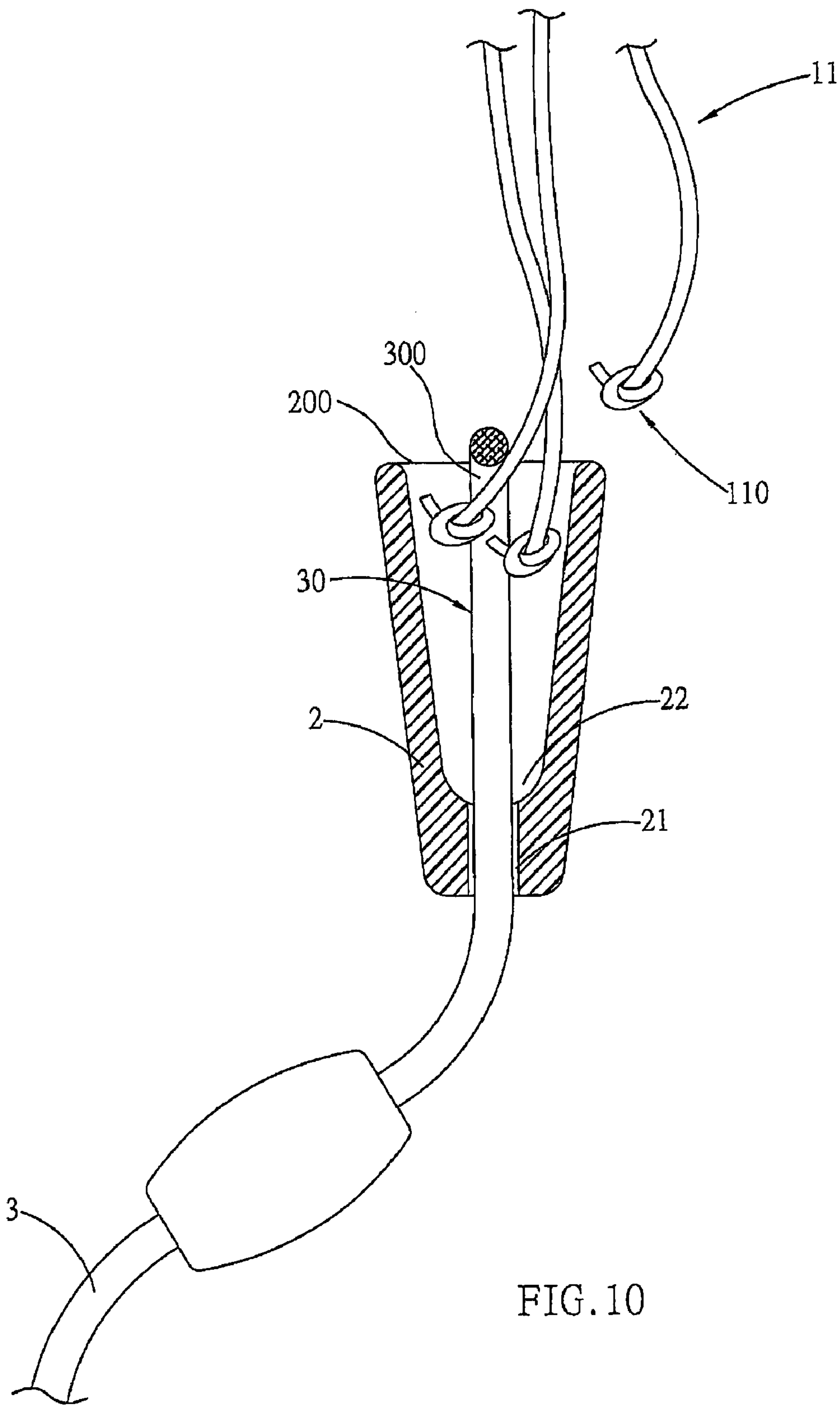
FIG. 10 is a schematic view depicting a bursting open safety operation according to the present invention.

Regarding the operating means of the instantaneous safety action, referring first to FIGS. 8-10, when the pull cords 11 are in a stationary state, the lower free ends of the pull cords 11 are gathered together and restrained by the wire hoop body 30 through the support of the drag cup 2. After a limb 13 passes through a gap in the pull cords 11, then the danger of entangling the limb must be prevented. Should the limb 13 pass through a gap in the pull cords 11, as described, because the upper ends of the pull cords 11 are relationally connected to the window curtain set (not shown in the drawings), thus, the hook cluster of knots 33 formed at the free ends of the pull cords 11 are restricted and made to maintain their original height position, and a binding acting force is effected on the limb 13. The present invention provides the mechanism whereby when the force of the limb 13 is directed downward, as long as the downward movement of the limb 13 causes the limb 13 to touch and press down on the opening 200 of the drag cup 2, then the entire drag cup 2 is displaced downward, and the through hole 21 of the drag cup 2 linearly drops down along a straight section 301 of the wire hoop body 30. The cavity bottom 22 correspondingly separates from the height position of the hook cluster of knots 33, at which time the through hole 21 releases its restricting force on the wire hoop body 30, thereby causing the existing restraining force to be relinquished. Because displacement of the through hole 21 causes two free side sections of the wire hoop body 302 to lengthen, thus, the wire hoop body 30 is able to freely spread apart. At the same time the wire hoop body 30 spreads apart, then the free ends of the pull cords 11 are provided with extended space and rapidly separate, after which the free end of each of the pull cords 11 are mutually untethered, thereby instantaneously releasing the binding force on the limb 13 and achieving the objective of the present invention. According to the aforementioned operation, in an emergency situation, the present invention provides the mechanism whereby downward direction of an external force from the limb 13 or erroneous operation presses down on the drag cup 2, causing the drag cup 2 to release all of its restricting force on the hook cluster of knots 33. And because the bodily form of the wire hoop body 30 relatively positioned at the upper portion of the drag cup 2 is able to freely spread out, thus, the free ends of the pull cords 11 are able to be unimpededly and rapidly untethered.

Hence, the aforementioned external force can quickly and easily be transformed into a bursting open operation, the reason for which is that only the light frictional force of the static state supports the combination relation of the drag cup 2 and the surfaces of the hook cluster of knots 33, thus, a light touch pressing down on the drag cup 2 is all it takes to transform the combination relation into a disengagement operation, thereby achieving the primary objective of easily releasing a binding force in an emergency situation. Furthermore, the hook cluster of knots 33 is held fast by dry clamping pressure between the free ends of the pull cords 11 and the inner loop side 300 of the wire hoop body 30. Moreover, because the effective forces of the pull cords 11 and the inner loop side 300 of the wire hoop body 30 are in opposite directions, thus, after the drag cup 2 is pushed back, then the wire hoop body 30 instantaneously bursts apart from the free ends of the pull cords 11, thereby releasing the free ends of the pull cords 11 and enabling them to freely hang. Accordingly, prompt response effectiveness is achieved.

After the plurality of pull cords 11 are released, gravity causes each of the pull cords 11 to hang down in parallel. Because the lower ends of neighboring pull cords 11 are open, and no longer closed up in a gathered state, thus, at this time, limbs are able to conveniently slide down and separate from the cord bodies and the free ends of the pull cords 11. Using the aforementioned function that enables easy and rapid untethering of a binding force provides the present invention with effective and prompt safety effectiveness.

Figure 11:
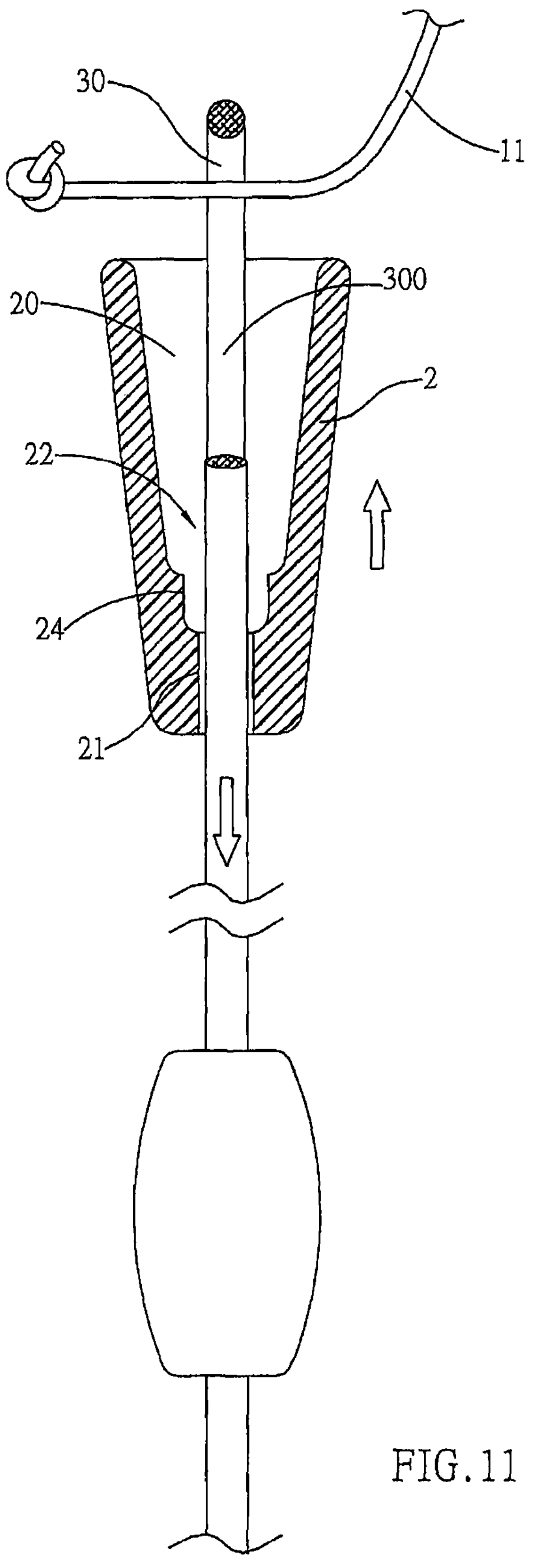
FIG. 11 is a schematic view depicting a further embodiment of the present invention.
Figure 12:
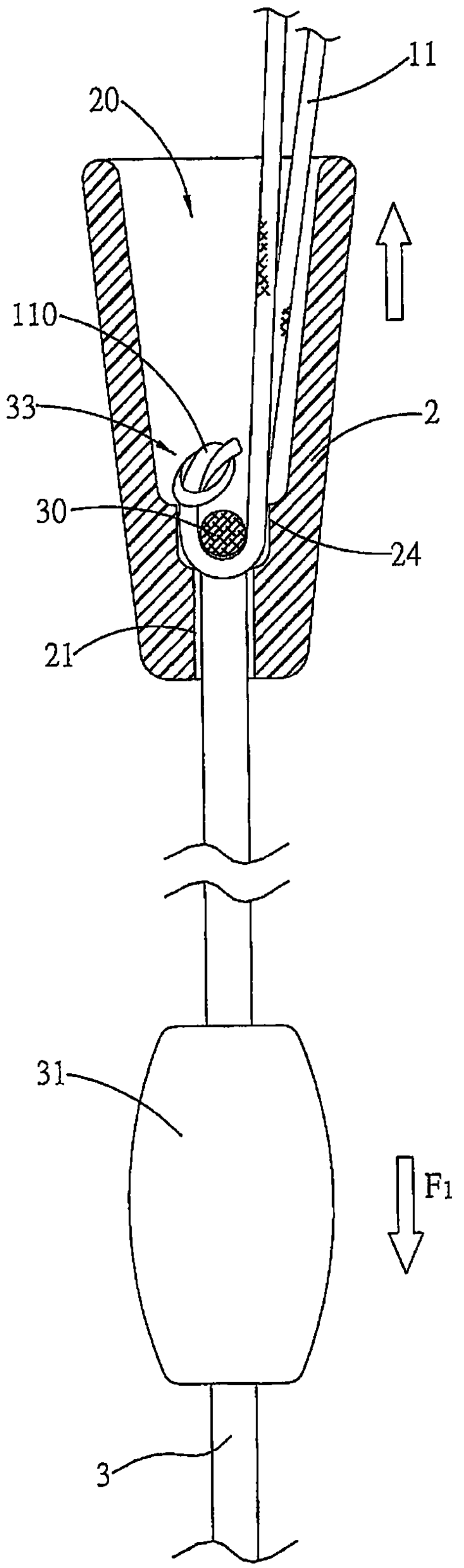
FIG. 12 is a completed combination view of FIG. 11.

Referring to FIGS. 11-12, which show the wire hoop body 30 passing through the through hole 21 of the drag cup 2, and passing through the concave cavity 20 to enable tethering the pull cords 11. The free ends of the pull cords 11 are pulled and curvedly bent into the cavity 20 of the drag cup 2, and finally curvedly clutched and restrained at the surface of the cavity bottom 22. The present invention provides a perpendicular groove portion 24 cut away downward from the bottom surface of the cavity 20 corresponding to a longitudinal relational line between the cavity bottom 22 and the through hole 21. The width of the groove surfaces of the perpendicular groove portion 24 is able to correspondingly effect a lateral clamping pressure on the wire hoop body 30 and the exterior of the restraining hook cluster of knots 33 of the pull cords 11, thereby enabling the drag cup 2 to achieve a pronounced static binding force and be retained at a high position. Moreover, the drag cup 2 will not be thrown down due to a strong wind producing a swinging movement of the pull cords 11. Accordingly, an adequate static binding force exists between the drag cup 2 and the hook cluster of knots 33, and the static binding force is relatively small compared to an external force from erroneous operation pressing downward.

The aforementioned hook cluster of knots 33 perpendicularly drop into the interior of the perpendicular groove portion 24, and during a dynamic operation whereby a downward pulling force F1 is applied, then the exterior of the hook cluster of knots 33 is subjected to restriction and friction from multiple surfaces, thereby causing transmission of an even larger force between the pulling member 3 and the pull cords 11. Furthermore, the knotted cord ends 110 at the ends of the pull cords 11 are further unable to slip back in the reverse direction, thereby causing the wire hoop body 30 to more forcibly hook onto the pull cords 11. When implementing a safety measure, the operating principle is the same as that described for FIGS. 9-10, enabling rapid safety effectiveness.

After achieving the aforementioned safety effectiveness, the drag cup 2 and the wire hoop body 30 have separated from the pull cords 11, and can be assembled in reverse according to the means described in FIGS. 4-5, gathering together the free ends of the pull cords 11 into a dynamic pulling linkage state, and further effecting a safety preparation state.

Figure 13:
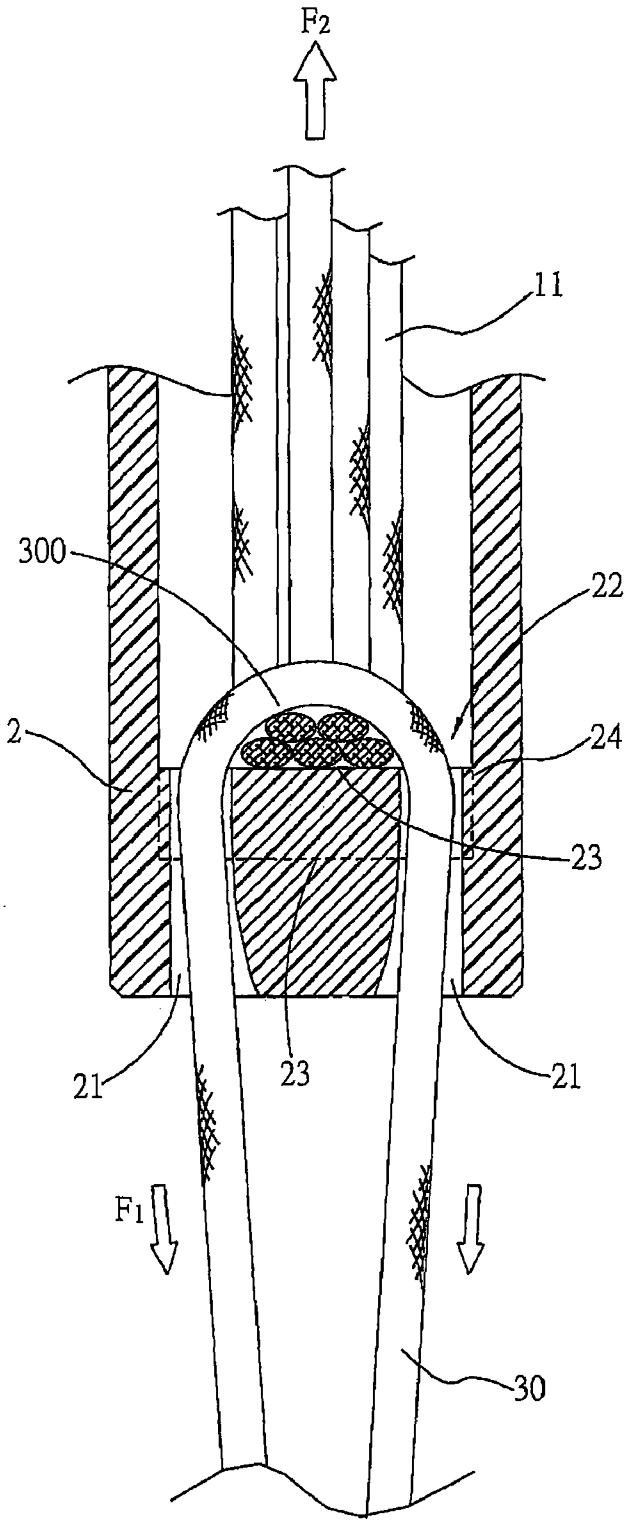
FIG. 13 is a front cutaway view depicting a drag cup provided with two through holes according to the present invention.

Referring to FIG. 13, which shows the inner bottom of the drag cup 2 perforated with mutually parallel through holes 21, which enable sections of two side wires of the wire hoop body 30 to respectively pass therethrough. A banded arch pressure surface 23 is formed on the surface of the cavity bottom 22 relationally between the two through holes 21. The surface of the arch pressure surface 23 can be a rough surface, thereby providing close contact friction with the lower edges of the pull cords 11. After the inner loop side 300 of the wire hoop body 30 loops round and binds the free ends of the pull cords 11, then the arch pressure surface 23 effects a counter restraining pressure. The arch pressure surface 23 is used to effect a banded pressure, and a plurality of the pull cords 11 assume a planar arrangement, thereby causing the body sections of the plurality of dangling pull cords 11 to be juxtaposed in parallel. Moreover, the cavity bottom 23 can be similarly downwardly provided with the perpendicular groove portion 24, and the bottom surface of the perpendicular groove portion 24 functions as the arch pressure surface 23.

Figure 14:
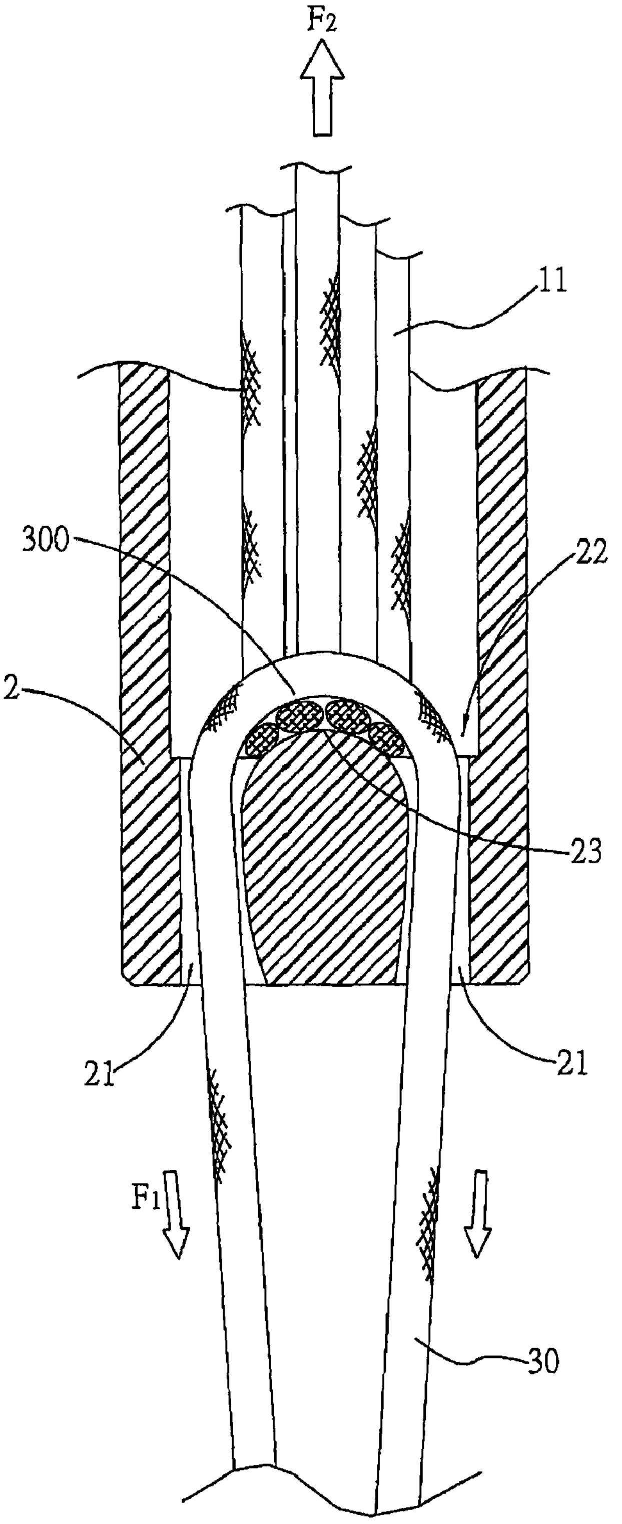
FIG. 14 is another front cutaway view depicting the drag cup provided with two through holes according to the present invention.

Referring to FIG. 14, which shows the drag cup 2 provided with the two through holes 21, and the arch pressure surface 23 is formed between the two holes. The arch pressure surface 23 is of domed form, the surface of which is rough. Surface length between two lengthened points of the arched arch pressure surface 23 is used as space for the pull cords 11 to loosen and spread out into, thereby enabling uniform restraining pressure height between the inner loop side 300 and the domed arch pressure surface 23, with the possibility of early bursting during the bursting open process of the pull cords 11 positioned at the two side ends.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. A window curtain pull cord concentrator safety device, enabling gathering together of the free ends of a plurality of pull cords of a window curtain set, as well as complete transmission of a pulling force, and in an emergency, instantaneously and easily releases the binding force of the pull cords, thereby rapidly safeguarding limbs entangled in the pull cords, comprising:

a drag cup, an upper portion of the drag cup is provided with an opening, and a concave cavity inwardly extends into an interior of the drag cup, a through hole downwardly perforates a cavity bottom of the concave cavity;

a pulling member, an upper end of the pulling member connects to a flexible wire hoop body, the wire hoop body penetrates into the concave cavity from a bottom portion of the drag cup by passing through the through hole, and free movement space of the wire hoop body comprises the concave cavity and the opening position;

wherein the cavity bottom of the drag cup is provided with a second through hole, enabling two side sections of the wire hoop body to respectively pass through the through hole and the second through hole; the wire hoop body is connected to a junction point of annular form, and is further connected to the pulling member; an arch pressure surface is formed between the through hole and the second through hole corresponding to the surface of the cavity bottom.

2. The window curtain pull cord concentrator safety device according to claim 1, wherein an inner loop of the wire hoop body enables the free ends of a set of the pull cords to pass therethrough, and knotted cord ends are formed at the ends of the pull cords.

3. The window curtain pull cord concentrator safety device according to claim 1, wherein the arch pressure surface is a curved surface.

4. The window curtain pull cord concentrator safety device according to claim 1, wherein the arch pressure surface is a rough surface.

5. The window curtain pull cord concentrator safety device according to claim 1, wherein a perpendicular groove portion is downwardly cut away between the cavity bottom and the through hole, the bottom surface of the perpendicular groove portion forms an arch pressure surface.

6. The window curtain pull cord concentrator safety device according to claim 1, wherein the pulling member is connected to the exterior of the junction point of the wire hoop body, and is further fitted with a pulling handle.

* * * * *